US011137565B2

(12) United States Patent
Qi

(10) Patent No.: US 11,137,565 B2
(45) Date of Patent: Oct. 5, 2021

(54) SYSTEM AND METHOD FOR THERMAL TREATMENT OF SURFACE BONDING OPTICAL PATCH CORD

(71) Applicant: East Point Communication Technology Company, Ltd., Shenzhen (CN)

(72) Inventor: Chaozhi Qi, Shenzhen (CN)

(73) Assignee: East Point Communication Technology Company, LTD, Shenzhen (CN)

( * ) Notice: Subject to any disclaimer, the term of this patent is extended or adjusted under 35 U.S.C. 154(b) by 0 days.

(21) Appl. No.: 16/186,654

(22) Filed: Nov. 12, 2018

(65) Prior Publication Data
US 2020/0150376 A1  May 14, 2020

(51) Int. Cl.
*B29C 61/00* (2006.01)
*B29C 65/18* (2006.01)
*B29C 65/52* (2006.01)
*G02B 6/44* (2006.01)
*H01B 13/00* (2006.01)
*B29C 65/00* (2006.01)
*B29L 11/00* (2006.01)

(52) U.S. Cl.
CPC .......... *G02B 6/4479* (2013.01); *B29C 61/00* (2013.01); *B29C 65/18* (2013.01); *B29C 65/524* (2013.01); *B29C 66/0242* (2013.01); *B29C 66/828* (2013.01); *H01B 13/0023* (2013.01); *B29L 2011/0075* (2013.01)

(58) Field of Classification Search
CPC ......... B29C 61/00; B29C 61/02; B29C 65/02; B29C 65/022; B29C 65/028; B29C 65/18; B29C 65/20; B29C 65/24; B29C 65/245; B29C 65/26; B29C 65/30; B29C 65/305; B29C 65/48; B29C 65/483; B29C 65/4835; B29C 65/485; B29C 65/52; B29C 65/524; B29C 65/525; B29C 66/024; B29C 66/0242; B29C 66/1122; B29C 66/5227; B29C 66/69; B29C 66/82; B29C 66/828; B29C 71/02; B29C 2071/022; B29L 2011/0075; B29L 2031/3462; G02B 6/4401; G02B 6/4479; G02B 6/448; G02B 6/4486; H01B 13/0023
See application file for complete search history.

(56) References Cited

U.S. PATENT DOCUMENTS

| 2,204,782 | A | * | 6/1940 | Wermine | ............. | B29C 48/156 |
| | | | | | | 156/55 |
| 3,316,134 | A | * | 4/1967 | Durakis | ............ | B29C 66/83413 |
| | | | | | | 156/47 |
| 3,574,015 | A | * | 4/1971 | Blee | ..................... | H01B 7/0853 |
| | | | | | | 156/47 |
| 3,974,016 | A | * | 8/1976 | Bondybey | ............. | B29C 66/934 |
| | | | | | | 156/272.8 |

(Continued)

*Primary Examiner* — Michael A Tolin

(57) ABSTRACT

A system, apparatus and method for thermal treatment of surface bonding optical is provided. An optical patch cord is surface bonded via thermal treatment with a tracer optical fiber which provides patch cord tracing in a bonding apparatus. During the process, the optical patch cord is also thermally treated to have the mechanical stress contained in its jacket relieved by rollers in the bonding apparatus to solve the patch cord shrink-back problem.

17 Claims, 3 Drawing Sheets

(56) References Cited

U.S. PATENT DOCUMENTS

| | | | | |
|---|---|---|---|---|
| 4,425,374 A | * | 1/1984 | McCutcheon, Sr. | B05D 7/20 156/275.5 |
| 6,273,977 B1 | * | 8/2001 | Harden | H01B 13/0023 156/244.12 |

* cited by examiner

SYSTEM AND METHOD FOR THERMAL TREATMENT OF SURFACE BONDING OPTICAL PATCH CORD

TECHNICAL FIELD

This invention relates to optical patch cords for communication networks. More specifically, this invention relates to a system and method for thermal treatment of surface bonding optical patch cord for optical communication networks.

BACKGROUND OF THE INVENTION

When deploying optical communication networks that require a plurality of optical patch cords being bundled together to run a distance from one end of the connection of the network to the other, tracing and identifying the corresponding ends of the bundled patch cords at the connection points are challenging. One innovative solution proposes bonding an optical fiber to the surface of the patch cord and using external light sources at the connection points to identify the corresponding ends of the same optical fiber, thereby identifying the corresponding ends of the patch cord by their respective bonding association to the optical fiber. See Qi, C., U.S. patent application Ser. No. 15/976,581, filed May 10, 2018 (hereinafter "'581 application").

The '581 application provides advantages over prior art solutions for identifying the corresponding ends of the patch cords in several ways. First, it uses external light source to trace the cords, which lowers the cost of the system comparing to internal light source proposed in the prior art. Using external light source also makes the cords more durable and easier to maintain, providing cost saving to the user. Second, the optical fibers that are surface-bonded to the patch cords are dielectric, thereby eliminating the need for grounding the patch cord tracing system whereas conventional proposals using conductive materials for tracing must do. Third, visible light, which does not interfere with the optical transmission in the optical patch cord, is used as tracing signals. Therefore, users can detect the signals with naked eyes, eliminating the need for additional signal detecting devices for non-visible tracing signals.

Although the '581 application enables people skilled in the art to make the invention disclosed therein using conventional equipment and methods, efficient and dedicated manufacturing apparatus and method would greatly improve the manufacturing process.

Further, the prior art patch cords on which the tracers are bonded have an undesirable characteristic called shrink-back. It is the tendency of the jacket of the patch cords to pull back from their original position, exposing the optical fibers that the jacket meant to cover and protect.

One major contributing factor causing patch cord shrink-back is the inherent mechanical stress created in the jacket of the patch cord during the manufacturing process. For example, if the optical fibers of the patch cord move faster than the molten materials for the jacket which will harden when cooled down during manufacture, the molten jacket material may be stretched but held in place by friction between the jacket and the optical fibers therein, leaving mechanical stress in the jacket of the patch cord. As a part of the process of making the patch cords, after the patch cords are freshly made by the machine, they are placed at room temperature for curing, which over time relieves some mechanical stress from the jacket. However, curing cannot eliminate much of the mechanical stress; much of it will remain. The residual mechanical stress that remains in the jacket of the patch cord will cause shrink-backs when the patch cord is cut short, the weather condition becomes severe, repeated temperature swings or due to wear and tear.

As such, it is highly desirable to have a system and method that not only improves the manufacturing process of the surface bonding optical patch cords, but also greatly reduces the residual mechanical stress causing shrink-backs of the patch cords.

SUMMARY OF THE INVENTION

One object of the present invention is to provide an apparatus for thermal treatment of a patch cord for surface bonding a tracer, including a first passage way for the patch cord; a second passage way for the tracer; at least one roller relieving stress of a jacket of the patch cord in a heated area; and a bonding point where the first passage way for the patch cord and the second passage way for the tracer intersect, wherein the tracer is surface bonded to the patch cord. The apparatus further may further include a third passage way for a bonding agent, wherein the bonding agent is applied at the bonding point to help bond the tracer to the patch cord. The at least one roller may further relieve the stress of the jacket of the patch cord in the heated area by applying surface pressure to the patch cord. The at least one roller may further provide a forward pushing force to push the patch cord forward. The apparatus may further include a reeling wheel that collects the surface bonded patch cord, whereas the reeling wheel further provides a pull force to pull the patch cord forward.

According to this object of the present invention, the patch cord may be one of a simplex optical fiber cord, a duplex optical fiber cord, and a ribbon optical fiber cord; the tracer may be a glass fiber and the bonding point may be located within the heated area.

Another object of the present invention is to provide a method for thermal treatment of a patch cord for surface bonding a tracer including the steps of providing a first passage way for the patch cord; providing a second passage way for the tracer; providing at least one roller relieving stress of a jacket of the patch cord in a heated area; and providing a bonding point where the first passage way for the patch cord and the second passage way for the tracer intersect, wherein the tracer is surface bonded to the patch cord. The method of may further including the step of providing a third passage way for a bonding agent, wherein the bonding agent is applied at the bonding point to help bond the tracer to the patch cord. The at least one roller may relieve the stress of the jacket of the patch cord in the heated area by applying surface pressure to the patch cord. The at least one roller may further provide a forward pushing force to push the patch cord forward. The method may also include a step of providing a reeling wheel that collects the surface bonded patch cord, whereas said reeling wheel further provides a pull force to pull the patch cord forward.

According to this object of the present invention, the patch cord may also be one of a simplex optical fiber cord, a duplex optical fiber cord, and a ribbon optical fiber cord; the tracer may be a glass fiber, and the bonding point may be located within the heated area.

Yet another object of the present invention is to provide a system for thermal treatment of a patch cord for surface bonding a tracer, including a thermal bonding apparatus; a patch cord; an optical fiber tracer; and a reeling wheel, wherein the optical fiber tracer and the patch cord are thermally bonded within the thermal bonding apparatus and collected by the reeling wheel. The thermal bonding apparatus including: a first passage way for the patch cord; a second passage way for the tracer; at least one roller relieving stress of a jacket of the patch cord in a heated area; and a bonding point where the first passage way for the patch cord and the second passage way for the tracer intersect, wherein the tracer is surface bonded to the patch cord. The at least one roller may relieve the stress of the jacket of the patch cord in the heated area by applying surface pressure to the patch cord. The patch cord may be one of a simplex optical fiber cord, a duplex optical fiber cord, and a ribbon optical fiber cord.

The apparatus, method and system disclosed in the present invention not only provide an efficient manufacturing process for surface bonding an optical fiber tracer to the patch cord, but also provide relieves to the shrink-back problem of the patch cord, thereby improving the quality of the surface bonding patch cord.

BRIEF DESCRIPTION OF THE DRAWINGS

The above-mentioned advantages and other features of the present invention will become more apparent to and the invention will be better understood by people of ordinary skill of the art with reference to the following description of the preferred embodiments of the invention taken in conjunction with the accompanying drawings, wherein.

DETAILED DESCRIPTION OF THE PREFERRED EMBODIMENTS

It is to be understood that all terminologies and phraseology used herein are for the purpose of illustrating and should not be understood as limiting. The phrases such as "including", "comprising", "having" and other variations thereof are meant to encompass the items as described, their equivalents without excluding any additional items thereof. Terms such as "coupled", "mounted", "connected" and other variations thereof are meant to be interpreted broadly to include any coupling, mounting and connection, directly or indirectly with or without intermediate items.

The embodiments of the present invention will now be described in conjunction with the accompanying drawings. It will be apparent to people of ordinary skill of the art that the described embodiments are merely part of the embodiments of the invention and are not intended to be exhaustive. All other embodiments obtained by those of ordinary skill in the art are within the scope of the present invention.

Figure 1:
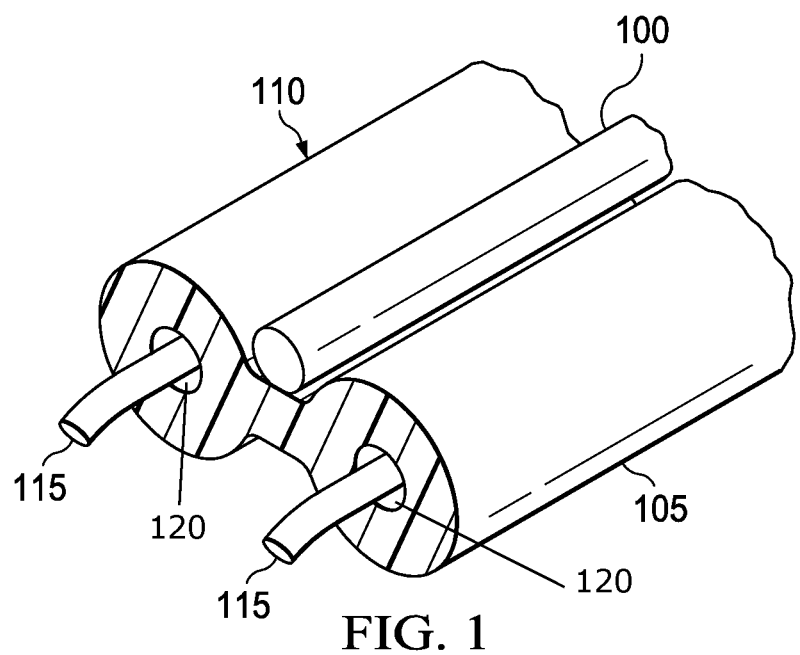
FIG. 1 is a surface bonding duplex optical patch cord bonded with a tracer optical fiber.

FIG. 1 illustrates a surface bonding duplex optical patch cord bonded with tracer optical fiber. Referring to FIG. 1, the duplex patch cord 110 comprises a patch cord jacket 105, a pair of passages 120 and a pair of optical fibers 115. Inside the patch cord 110, each of the pair of the optical fibers 115 runs in a passage 120 within the cable jacket 105. On the exterior of the patch cord 110, a tracer optical fiber 100 is bonded to the surface of the patch cord jacket 105. The bonding process will be further described later.

As illustrated in FIG. 1, the tracer optical fiber 100 is generally small or miniscule relative to the patch cord 110 and does not significantly alter the contour, weight, volume, or other physical characteristics of the patch cord. The patch cord 110 and the optical fiber 100 have substantially the same length. The tracer optical fiber 100 may be one of a glass fiber, a plastic fiber or other fiber and optical device, that allows optical tracing signals to be transmitted in it from one end thereof to the other.

Figure 2A:
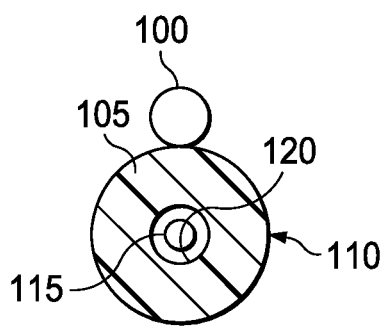
FIG. 2A is a cross sectional view of a simplex patch cord bonded with a tracer optical fiber.
Figure 2B:
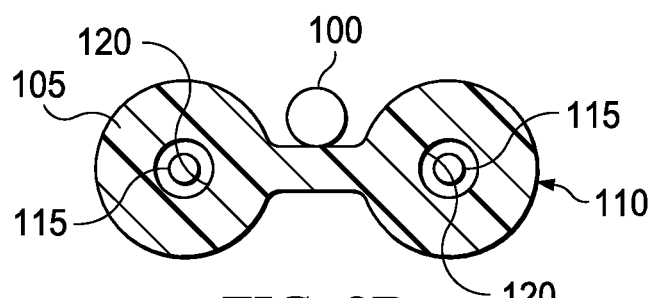
FIG. 2B is a cross sectional view of a duplex patch cord bonded with a tracer optical fiber.
Figure 2C:
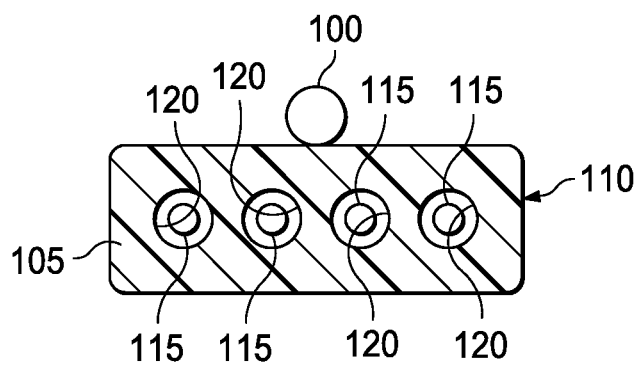
FIG. 2C is a cross sectional view of a ribbon patch cord bonded with a tracer optical fiber.

In additional to the duplex patch cord which contains two optical fibers, other types of patch cords with a tracer optical fiber can also be made according to the present invention. FIGS. 2A, 2B and 2C are cross sectional views of, respectively, a simplex, a duplex, and a ribbon patch cord with surface bonding tracer optical fiber. As illustrated in FIG. 2A, the tracer optical fiber 100 is bonded on the surface of jacket 105 of the simplex patch cord 110. FIG. 2B illustrates a duplex patch cord, the perspective view was described in detail in FIG. 1. According to FIG. 2B, the tracer optical fiber 100 is bonded in the gap between the two dumb bell-shaped ends of a duplex patch cord 110, wherein the pair of optical fibers 115 runs in two parallel passages 120 along the length of the duplex patch cord 110. The gap between the two passages 120 of the duplex cord is a preferred position to bond the tracer optical fiber 100 as it provides a bay to protect the tracer from external mechanical forces that may be exerted on the patch cord. In FIG. 2C, the tracer optical fiber 100 is surface-bonded to a ribbon patch cord 110 having a plurality of parallel passages 120. The ribbon patch cord 110 may consist of a number of 4, 8, 16, 32 or more passages, each having an optical fiber 115 running in it along the length of the patch cord.

Figure 3:
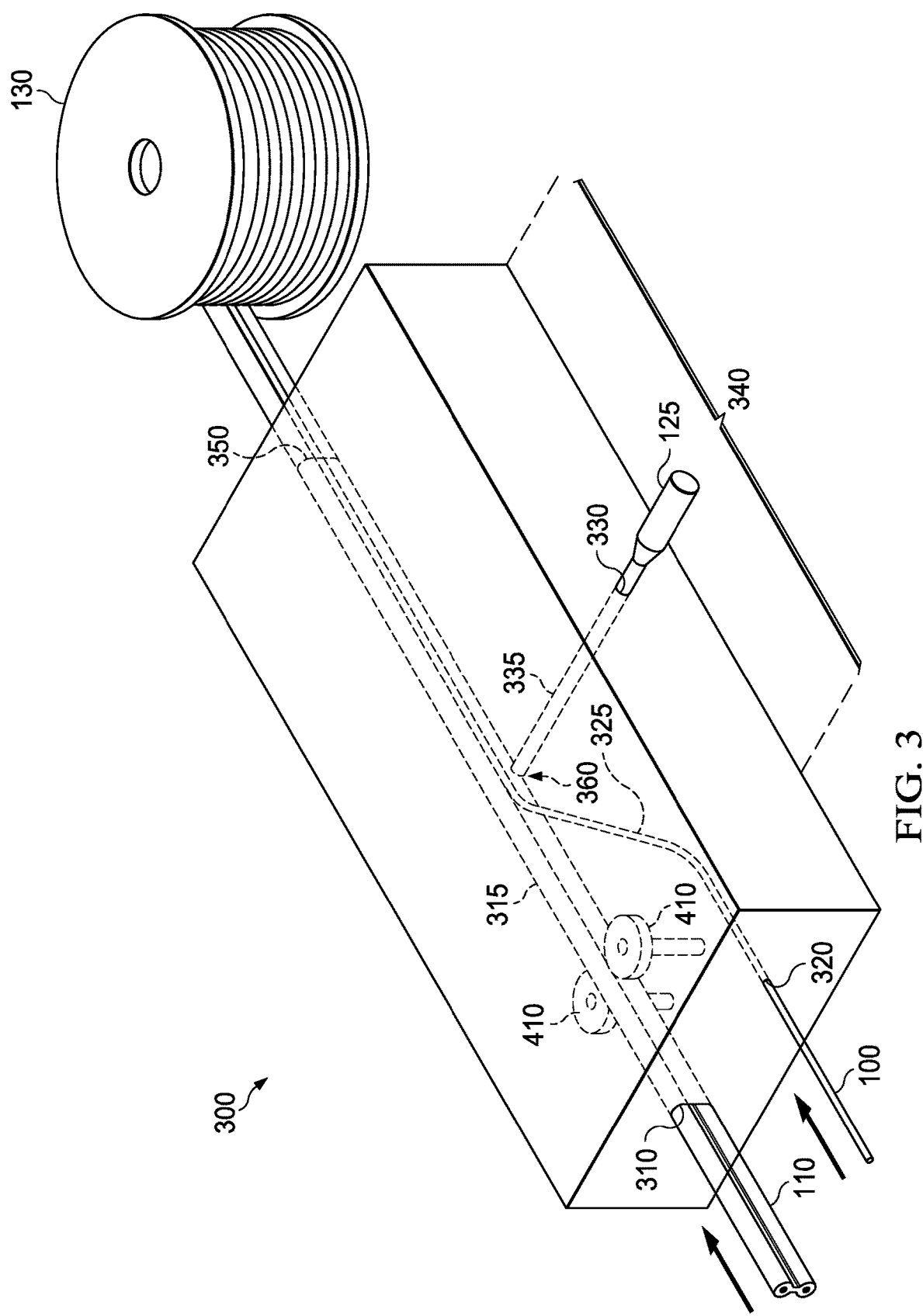
FIG. 3 is a schematic view of the bonding apparatus for thermal treatment of the surface bonding optical patch cord according to a preferred embodiment of the present invention.

The apparatus, system and method of manufacturing the surface bonding patch cords illustrated in FIGS. 1-2C above will now be described in detail in conjunction with FIGS. 3-4. FIG. 3 is a schematic view of the bonding apparatus for thermal treatment of the surface bonding optical patch cord that reduces shrink-back according to a preferred embodiment of the present invention. Now referring to FIG. 3, an aperture 310 is located at an outside surface of the bonding apparatus 300. Passage way 315 that begins from the aperture 310 extends inwardly into the bonding apparatus 300 and is configured to receive the patch cord 110 to be bonded in the system and apparatus. Another aperture 320 is also located at the outside surface of the bonding apparatus 300. Passage way 320 that begins from the aperture 320 also extends inwardly into the bonding apparatus 300 and is configured to receive the tracer optical fiber 100 to be bonded with the patch cord 110. Yet another aperture 330 is located at the outside surface of the bonding apparatus 300. Passage way 335 that begins from the aperture 330 also extends inwardly into the bonding apparatus 300 and is configured to receive a bonding agent, such as epoxy or other bonding agents.

The passage way 315 runs through the inside of bonding apparatus 300 and ends at aperture 350, which is on another outside surface of bonding apparatus 300. When in operation, the unbonded patch cord 110 is received from aperture 310 and moves along the passage way 315. During its movement in the passage way 315, the patch cord will enter into the thermal treatment area 340. The thermal treatment area 340 of the bonding apparatus 300 has high temperature which heats up the jacket 105 of the patch cord 110 to prepare it for stress relief which will be further described in connection with FIG. 4 below.

Further along the passage way 315, the heated patch cord 110 will go in-between a pair of rotating rollers 410 that thermally relieves the mechanical stress in the patch cord jacket. Detailed description of the stress relieving process will be described in conjunction with FIG. 4 below. After being processed by the rotating rollers 410, the patch cord 110 is bonded with the tracer optical fiber 100 at bonding point 360. The bonding may be assisted by optionally applying a bonding agent such as epoxy at the bonding point 360. Thereafter, the thermal treated surface bonding patch cord exits bonding apparatus 300 at aperture 350. It is pulled by and wrapped onto a reeling wheel 130. The surface bonded patch cord will stay on the reeling wheel 130 for a prolonged period of time for cooling down and curing. The reeling wheel rotates at a predetermined speed to provide the appropriate pull force that moves the patch cord 110 through the passage way 315.

According to a preferred embodiment of the present invention, the tracer optical fiber 100 enters the passage way 325 at aperture 330. The passage way 325 runs increasingly closer to the passage way 315 inside the bonding apparatus 300 and terminates at the bonding point 360. At the bonding point 360, the patch cord 110 and tracer optical fiber 100 is thermally bonded together. Thereafter, the patch cord 110 bonded with the tracer optical fiber 100 continues to move along the passage way 315. Bonding agent may be applied at the bonding point 360 that is supplied through the passage way 335. More specifically, the bonding agent, such as epoxy, enters the bonding apparatus 300 at the aperture 330. It moves along the passage way 335 and is applied to the patch cord and the tracer optical fiber to bond them together at the bonding point 360.

Although the illustration of the bonding apparatus 300 is of a cuboid configuration, it is understood by people skill of the art that the bonding apparatus 300 may be configured to have other shapes that provide the required apertures, passage ways, and inner mechanisms disclosed herein. Similarly, the apertures 310, 320, 330 and 350 may be configured to be located at any outside surface of the bonding apparatus 300, provided that their respective passage ways are extended as disclosed herein.

Figure 4:
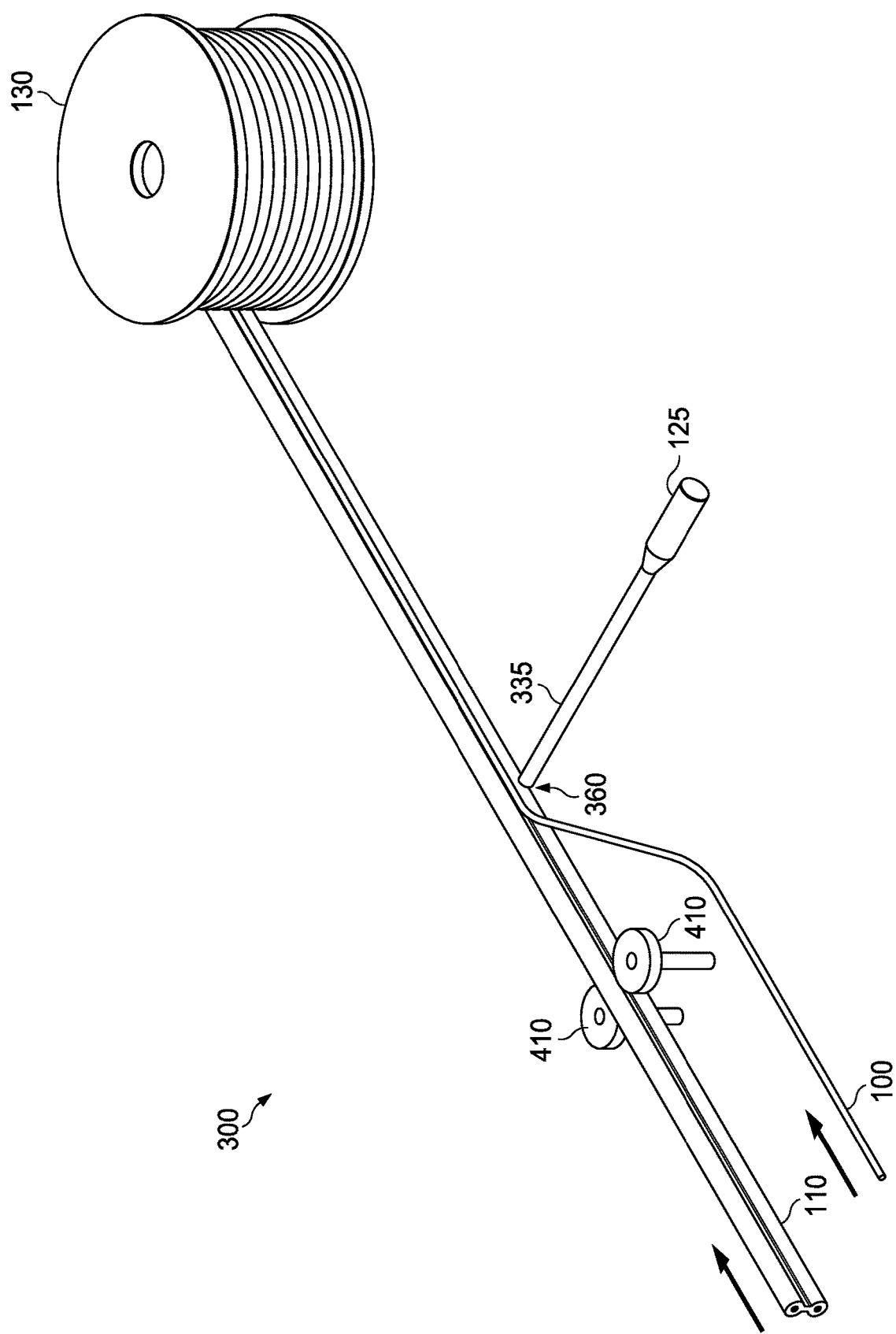
FIG. 4 is a schematic view of the inside mechanism of the bonding apparatus according to a preferred embodiment of the present invention.

FIG. 4 is a schematic view of the inside mechanism of the bonding apparatus 300 according to a preferred embodiment of the present invention. As illustrated in FIG. 3, after the patch cord 110 enters the aperture 310 along the passage way 315, the patch cord 110 moves into the thermal treatment area 340, wherein an appropriate amount of heat for the thermal treatment the patch cord for stress relief and surface bonding is applied. The amount of heat the jacket 105 of the patch cord 110 receives is determined by factors including the thermal characteristics of the material of the jacket 105, the speed of the movement of the patch cord 110 in the bonding apparatus 300, the length of thermal treatment area on the passageway 315 and the temperature of the area 340. By adjusting those factors, the appropriate amount of heat the patch cord receives can be controlled and adjusted for various patch cord products.

After the jacket 105 of the patch cord 110 has received the appropriate amount of heat in the thermal treatment area 340 for stress relief, the patch cord then moves in-between two round rollers 410 rotating in opposite directions, pressing the patch cord jacket 105 from opposite sides and at the same time pushing it forward. The mechanical forces received by the patch cord jacket 105 generated by the rotation of the rollers 410 can be analyzed as consisting of a push force that is parallel, and a surface pressing force that is perpendicular, to the moving direction of the patch cord 110. The push force generated by the rollers 410, together with the pull force generated by the reeling wheel 130 as illustrated in FIG. 3, moves the patch cord 110 forward in the bonding apparatus 300.

At the time when the patch cord 110 reaches the rollers 410, jacket 105 has received appropriate amount of heat for the jacket to be stress-relieved by the surface pressing forces generated by the rollers 410. Under the pressure of the rollers 410, when patch cord 110 goes between them, the material of the jacket 115 will reconstruct and reorganize physically to release the mechanical stress that was left therein during the initial manufacturing process. The mechanical stress in the portions of the jackets 115 that were stretched and held in place during the process is released under the thermal treatment and surface pressing by the rollers 410. Although FIG. 4 only illustrates a duplex patch cord, people skilled in the art understand that simplex patch cords and the ribbon patch cords as illustrated in FIGS. 2A and 2C can also be processed in a similar fashion. Whereas the simplex patch cords do not have a preferred orientation, the ribbon patch cords will have a preferred orientation of being pressed by rollers 410 from the wider sides of its cross sectional view.

As illustrated in FIGS. 3 and 4, the tracer optical fiber 100 enters the bonding apparatus 300 through aperture 320 and moves along the passage way 325. According to a preferred embodiment, the trajectory of the passage way 325 is configured in such a way that it gets increasingly closer to the passage way 315 until the passage ways 315 and 325 cross at the bonding point 360. The tracer optical fiber 100 in passage way 315 is bonded to the patch cord 110 at the bonding point 360.

A bonding agent container 125 containing bonding agents, such as epoxy, may be used to further assist the bonding. When used, the bonding agent enters the bonding apparatus 300 through aperture 330 and moves along the passage way 335 as illustrated in FIG. 4. According to a preferred embodiment, passage way 335 is configured to reach the bonding point 360 and terminates therein. The bonding agent is then applied to the surface of the patch cord 110 and the tracer optical fiber 100, such that the patch cord 110 and the tracer optical fiber 100 are bonded as exemplarily illustrated in FIGS. 2A-2C.

Although applying the bonding agent to assist the bonding of the tracer optical fiber 100 to the patch cord 110 is a preferred embodiment of the present invention, it should be understood by people skill in the art that the bonding may also take place without the bonding agent, depending on the materials and thermal characteristics of the patch cord 110 and the tracer optical fiber 100. As such, people skilled in the art understand that direct thermal bonding enabled by thermal treatment of the patch cord and the tracer optical fiber without bonding agent is within the scope of the present invention.

After the bonding point 360, the bonded patch cord with tracer optical fiber continues to move along the passage way 315 as it is pushed by the rollers 410 and pulled by the reeling wheel 130 until it leaves the bonding apparatus 300 at aperture 350. Thereafter, the bonded patch cord moves forward and is received by the reeling wheel 130 and wrapped thereon. The bonded patch cord will stay on the reeling wheel 130 for a period of time for cooling down and curing. As a result of the process, the thermal treated surface bonding patch cord with tracer optical fiber is stress relieved.

The patch cord with the bonded tracer optical fiber is now less shrink-back prone and will endure harsh weather conditions and wide temperature swings with less or no shrink-backs.

Although the embodiments of the present invention as illustrated in FIGS. 3 and 4 only shows the stress relieving process with respect to duplex patch cords, people skill in the art understood that other patch cords illustrated in FIGS. 2A and 2C can also be processed in the bonding apparatus 300 with minimal and obvious modifications. As such, bonding apparatuses for bonding and stress-relieving of other types of optical patch cords are also within the scope of the present invention.

According to the descriptions made with respect to FIGS. 3 and 4, the method of manufacturing the thermally treated shrink-back relieved patch cord involves the following steps:

Providing a patch cord to the bonding apparatus 300, and supplying it through the passage way 315;
Providing a tracer optical fiber 100, and supplying it through the passage way 325;
Optionally providing a bonding agent via the container 125 and supplying it through the passage way 335;
Thermally treating the jacket of the patch cord with rollers 410 to relieve the stress of the jacket;
Bonding the tracer optical fiber 100 to the patch cord 110 at the bonding point 360, where a bonding agent may be used.

To assist the process, a reeling wheel 130 also provides a pull force and the rollers 410 a push force.

The steps described above are for illustrations only and do not restrict the steps to be executed in the same sequence or in any other respect. Some steps may be combined, and more steps may be added, while several steps may be combined into one step. Concurrent or switched steps that are consistent with the descriptions made in connection with FIGS. 3 and 4 are also within the scope of the present invention.

The scope of the present invention should be determined, not with reference to the above description, but with reference to the appended claims, along with the full scope of equivalents to which such claims are entitled.

The Abstract of the Disclosure is provided to allow the reader to quickly ascertain the nature of the technical disclosure. It is submitted with the understanding that it will not be used to interpret or limit the scope of the claims. In addition, in the foregoing Detailed Description of the Preferred Embodiments, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. As such, the following claims are hereby incorporated into the Detailed Description of the Preferred Embodiments, with each claim standing on its own as a separately claimed subject matter.

What I claim is:

1. An apparatus for thermal treatment of a patch cord and surface bonding a tracer on said patch cord, comprising:
   a first passageway in the apparatus for the patch cord;
   a second passageway in the apparatus for the tracer;
   at least one roller configured to relieve stress of a jacket of the patch cord in a thermal treatment area of the apparatus;
   a bonding point where the first passageway in the apparatus for the patch cord and the second passageway in the apparatus for the tracer intersect; and
   a third passageway in the apparatus configured to guide a bonding agent, wherein the bonding agent is applied at the bonding point to help bond the tracer to the patch cord and form a surface bonded patch cord.

2. The apparatus of claim 1, wherein the at least one roller relieves the stress of the jacket of the patch cord in the thermal treatment area by applying surface pressure to the patch cord.

3. The apparatus of claim 2, wherein the at least one roller further provides a forward pushing force to push the patch cord in a forward direction.

4. The apparatus of claim 2, further comprising:
   a reeling wheel that collects the surface bonded patch cord, wherein said reeling wheel further provides a pulling force to pull the patch cord in a forward direction.

5. The apparatus of claim 1, wherein the patch cord is one of a simplex optical fiber cord, a duplex optical fiber cord, and a ribbon optical fiber cord.

6. The apparatus of claim 1, wherein the tracer is a glass fiber.

7. The apparatus of claim 1, wherein the bonding point is located within the thermal treatment area.

8. A system for thermally treating a patch cord and surface bonding a tracer on said patch cord, comprising:
   the apparatus for thermal treatment and surface bonding according to claim 1;
   the patch cord;
   the tracer; and
   a reeling wheel,
   wherein the tracer and the patch cord are thermally bonded within the apparatus to form a surface bonded patch cord and the surface bonded patch cord is collected by the reeling wheel.

9. The system of claim 8, wherein the at least one roller relieves stress of the jacket of the patch cord in the thermal treatment area by applying surface pressure to the patch cord.

10. The system of claim 8, wherein the patch cord is one of a simplex optical fiber cord, a duplex optical fiber cord, and a ribbon optical fiber cord.

11. A method for thermal treatment of a patch cord and surface bonding the patch cord with a tracer, comprising:
   providing the apparatus for thermal treatment and surface bonding according to claim 1;
   providing a patch cord to the first passageway in the apparatus;
   providing a tracer to the second passageway in the apparatus;
   using the at least one roller to relieve stress of a jacket of the patch cord in the thermal treatment area of the apparatus;
   guiding a bonding agent through the third passageway to the bonding point to help bond the tracer to the patch cord; and
   bringing the patch cord and the tracer together at the bonding point where the first passageway in the apparatus for the patch cord and the second passageway in the apparatus for the tracer intersect to surface bond the tracer to the patch cord to form a surface bonded patch cord.

12. The method of claim 11, wherein the at least one roller relieves the stress of the jacket of the patch cord in the thermal treatment area by applying surface pressure to the patch cord.

13. The method of claim 12, wherein the at least one roller further provides a forward pushing force to push the patch cord in a forward direction.

14. The method of claim 12, further comprising:
   collecting the surface bonded patch cord on a reeling wheel, wherein said reeling wheel further provides a pulling force to pull the patch cord in a forward direction.

15. The method of claim 11, wherein the patch cord is one of a simplex optical fiber cord, a duplex optical fiber cord, and a ribbon optical fiber cord.

16. The method of claim 11, wherein the tracer is a glass fiber.

17. The method of claim 11, wherein the bonding point is located within the thermal treatment area of the apparatus.

* * * * *